(12) United States Patent
Larson et al.

(10) Patent No.: US 12,521,964 B2
(45) Date of Patent: Jan. 13, 2026

(54) MULTI-REGION SURFACING FILM FOR ENHANCED ADHESION OF FINISHES TO THERMOPLASTIC SURFACES

(71) Applicant: The Boeing Company, Arlington, VA (US)

(72) Inventors: Michael Harris Larson, Mercer Island, WA (US); Marcus Anthony Belcher, Sammamish, WA (US); Gwendolyn Marie Janda, Seattle, WA (US); Gregory Martin Reyneke, Seattle, WA (US); Ying Shi, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 220 days.

(21) Appl. No.: 18/449,239

(22) Filed: Aug. 14, 2023

(65) Prior Publication Data

US 2025/0058545 A1 Feb. 20, 2025

(51) Int. Cl.
| | |
|---|---|
| *B32B 27/08* | (2006.01) |
| *B32B 7/023* | (2019.01) |
| *B32B 27/28* | (2006.01) |
| *B32B 37/18* | (2006.01) |
| *B64C 1/00* | (2006.01) |

(52) U.S. Cl.
CPC .............. *B32B 7/023* (2019.01); *B32B 27/08* (2013.01); *B32B 27/285* (2013.01); *B32B 37/182* (2013.01); *B32B 2250/24* (2013.01); *B32B 2270/00* (2013.01); *B32B 2307/20* (2013.01); *B32B 2307/4026* (2013.01); *B32B 2307/71* (2013.01); *B32B 2307/7376* (2023.05); *B32B 2371/00* (2013.01); *B32B 2605/12* (2013.01); *B32B 2605/18* (2013.01); *B64C 1/00* (2013.01)

(58) Field of Classification Search
CPC ............ B32B 2250/24; B32B 2270/00; B32B 2307/20; B32B 2307/402; B32B 2307/4026; B32B 2307/71; B32B 2307/7376; B32B 2371/00; B32B 2605/00; B32B 2605/12; B32B 2605/18; B32B 27/08; B32B 27/20; B32B 27/285; B32B 37/182; B32B 7/023; B64C 1/00
See application file for complete search history.

(56) References Cited

U.S. PATENT DOCUMENTS

| | | |
|---|---|---|
| 2005/0181203 A1 | 8/2005 | Rawlings et al. |
| 2013/0078435 A1 | 3/2013 | Massetti |
| 2021/0060607 A1 | 3/2021 | Brei et al. |
| 2023/0127785 A1 | 4/2023 | Willms et al. |
| 2023/0159754 A1 | 5/2023 | Shi et al. |

OTHER PUBLICATIONS

JP 4450337, Apr. 14, 2010.*
EP Search Report mailed Nov. 14, 2024 in re EP Application No. 24175858.0.

* cited by examiner

*Primary Examiner* — Lawrence D Ferguson
(74) *Attorney, Agent, or Firm* — COATS & BENNETT, PLLC

(57) ABSTRACT

Thermoplastic composite material structures comprise a multi-region thermoplastic surfacing film layer that further comprises first and second regions within the multi-region thermoplastic surfacing film layer having visually-detectable colors different from one another to facilitate surfacing film layer processing, and processing of the thermoplastic composite material stack.

28 Claims, 6 Drawing Sheets

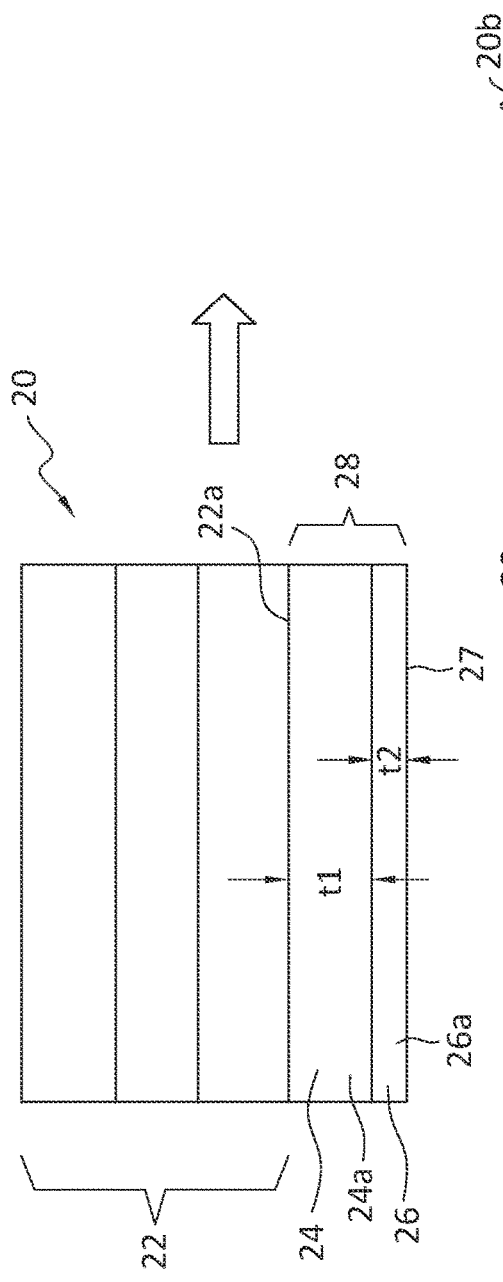
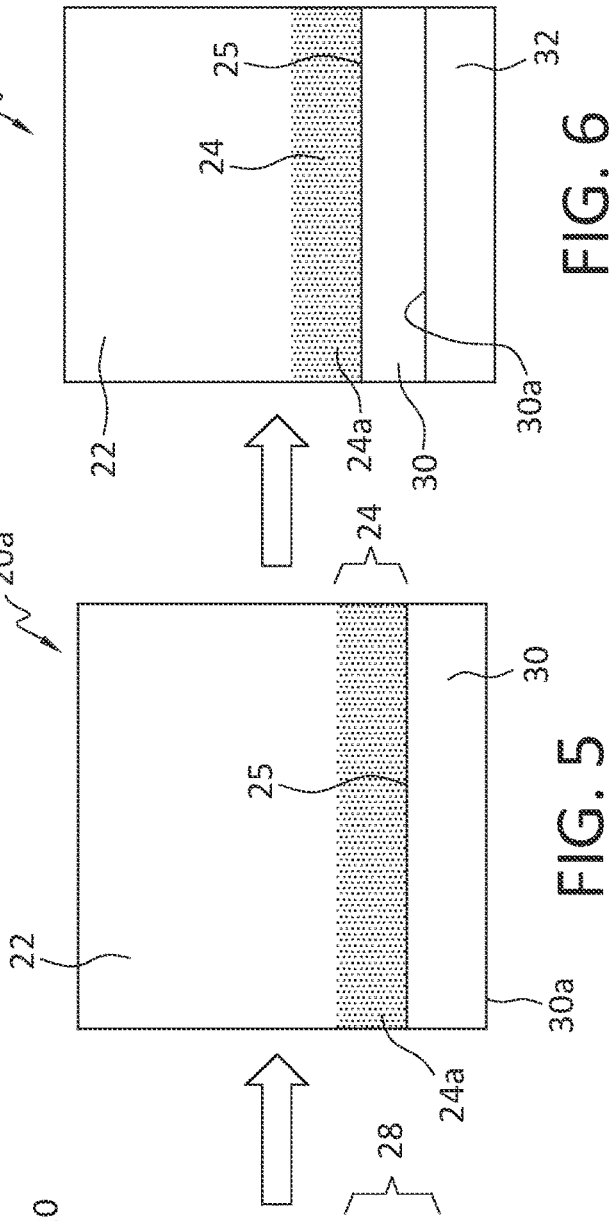

MULTI-REGION SURFACING FILM FOR ENHANCED ADHESION OF FINISHES TO THERMOPLASTIC SURFACES

TECHNOLOGICAL FIELD

The present disclosure generally relates to the field of composite materials, and composite materials used for manufacturing large structural components. More specifically, the present disclosure relates to the field of thermoplastic composite materials used as structural materials for interior and exterior surfaces of components, assemblies, and large structural aircraft components.

BACKGROUND

The use of thermoplastic polymer materials in the manufacture of various structural component parts continues to increase. At least due to the strength-to-weight ratios, thermoplastic materials offer advantages as replacements for denser materials, such as, for example, metals, metal alloys, etc., where the overall weight of a completed structure (or the weight of a component part of a completed structure) is a consideration in the selection of materials used in the manufacture of such a completed structure, or in the manufacture of a component of a completed structure.

Adhering or otherwise incorporating added material layers (e.g., primer, paint, topcoat, etc.), including thermoset coatings that can include, for example, epoxy-based coatings to thermoplastic polymer material substrates can require treatment of the thermoplastic substrate material before adding the additional material layers to form a selected composite material "stack". In addition, in the case of various primers, paint, topcoat, etc. (collectively referred to herein as "coating layers" and/or "coating materials"), such coating materials also may need rework or replacement or otherwise require removal from a thermoplastic polymer material substrate structure during the useful life of the thermoplastic polymer substrate structure. Reliably removing selected material layers, and selected amounts of certain material layers, while leaving underlayers undisturbed has been difficult and labor-intensive and can significantly impact processing cost and time.

Unless explicitly identified as such, no statement herein is admitted as prior art merely by its inclusion in the Technological Field and/or Background section.

SUMMARY

Present aspects are directed to a multi-region polymer film layer having at least two regions that are visually distinct from one another, with the multi-region polymer film configured as an intermediate layer to improve adhesion between the surface of a thermoplastic substrate of a thermoplastic component to a finishing surface layer. Further present aspects are directed to a thermoplastic component comprising the multi-region polymer film, aircraft comprising the thermoplastic component comprising the multi-region polymer film, and methods of improving adhesion and conserving surfacing film layers used in the manufacture of thermoplastic composite materials and material stacks.

A present aspect is therefore directed to a multi-region thermoplastic surfacing film layer for a thermoplastic composite part, with the multi-region thermoplastic surfacing film layer including a thermoplastic surfacing film layer first region, with the thermoplastic surfacing film layer first region comprising a first visually-detectable color, further region comprising a thermoplastic surfacing film layer first region average thickness. The multi-region thermoplastic surfacing film layer further includes a thermoplastic surfacing film layer second region positioned immediately adjacent the thermoplastic surfacing film layer first region, with the thermoplastic surfacing film layer second region comprising a second visually-detectable color and further including a thermoplastic surfacing film layer second region average thickness. The thermoplastic surfacing film layer first region can be co-extruded with the thermoplastic surfacing film layer second region to form the multi-region thermoplastic surfacing film, and wherein the first visually-detectable color is visually different from the second visually-detectable color.

In another aspect, the thermoplastic surfacing film layer first region average thickness is greater than the thermoplastic surfacing film layer second region average thickness.

In another aspect, the thermoplastic surfacing film layer first region thickness comprises a first substantially equivalent average thickness across the area of the thermoplastic surfacing film layer first region, with the first substantially equivalent average thickness ranging from about 0.75 mils to about 10 mils.

In another aspect, the thermoplastic surfacing film layer second region thickness comprises a second substantially equivalent average thickness across the area of the thermoplastic surfacing film layer second region, with the second substantially equivalent average thickness ranging from about 0.25 mils to about 5 mils.

In another aspect, the average thickness of said thermoplastic surfacing film layer first region average thickness compared to the thermoplastic surfacing film layer second region average thickness establishes an average thickness ratio ranging from about 3:1 to about 10:1.

In another aspect, the average thickness of said thermoplastic surfacing film layer first region average thickness compared to the thermoplastic surfacing film layer second region average thickness and further establishes a n average thickness ration ranging from about 4:1.

In another aspect, the first visually-detectable color and the second-visually detectable color are both detectable by the human eye.

In another aspect, at least one of the first visually-detectable color and the second-visually detectable color are detectable by an optical sensor.

In another aspect, at least one of the first and second region of the multi-region thermoplastic surfacing film further includes a UV/visible light-resistant material.

In another aspect, the thermoplastic surfacing film layer has a resistivity ranging from about $1 \times 10e^5$ to about $1 \times 10e^{11}$ ohm-meter (ohm-m), and preferably from about $1 \times 10e^5$ to about $1 \times 10e^8$ ohm-m.

Another present aspect is directed to a thermoplastic structure, with the thermoplastic structure including a thermoplastic material substrate comprising a thermoplastic material substrate surface and a multi-region thermoplastic surfacing film layer positioned immediately adjacent the composite material substrate surface, with the multi-region thermoplastic surfacing film layer including a thermoplastic surfacing film layer first region, with the thermoplastic surfacing film layer first region positioned immediately adjacent the thermoplastic composite material substrate surface, with the thermoplastic surfacing film layer first region comprising a first visually-detectable color and a thermoplastic surfacing film layer first region thickness. The multi-region thermoplastic surfacing film layer further includes a thermoplastic surfacing film layer second region positioned immediately adjacent the thermoplastic surfacing film layer first region, with the thermoplastic surfacing film layer second region comprising a second visually-detectable color and further including a thermoplastic surfacing film layer second region average thickness. The thermoplastic surfacing film layer first region is co-extruded with the thermoplastic surfacing film layer second region to form the multi-region thermoplastic surfacing film, and wherein the first visually-detectable color is visually different from the second visually-detectable color.

In another aspect, the thermoplastic surfacing film layer first region average thickness is greater than the thermoplastic surfacing film layer second region average thickness.

Another present aspect is directed to an object comprising a thermoplastic structure, with the thermoplastic structure including a thermoplastic material substrate comprising a thermoplastic material substrate surface and a multi-region thermoplastic surfacing film layer positioned immediately adjacent the composite material substrate surface, with the multi-region thermoplastic surfacing film layer including a thermoplastic surfacing film layer first region, with the thermoplastic surfacing film layer first region positioned immediately adjacent the thermoplastic composite material substrate surface, with the thermoplastic surfacing film layer first region comprising a first visually-detectable color and a thermoplastic surfacing film layer first region thickness. The multi-region thermoplastic surfacing film layer further includes a thermoplastic surfacing film layer second region positioned immediately adjacent the thermoplastic surfacing film layer first region, with the thermoplastic surfacing film layer second region comprising a second visually-detectable color and further including a thermoplastic surfacing film layer second region average thickness. The thermoplastic surfacing film layer first region is co-extruded with the thermoplastic surfacing film layer second region to form the multi-region thermoplastic surfacing film, and wherein the first visually-detectable color is visually different from the second visually-detectable color, and wherein said thermoplastic surfacing film layer first region average thickness is greater than the thermoplastic surfacing film layer second region average thickness.

In another aspect, the object is a vehicle.

In another aspect, the vehicle is selected from the group consisting of a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed surface water borne vehicle, a crewed sub-surface waterborne vehicle, an uncrewed sub-surface waterborne vehicle, and combinations thereof.

Another present aspect is directed to an aircraft comprising a thermoplastic structure, with the thermoplastic substrate including a thermoplastic structure, with the thermoplastic structure including a thermoplastic material substrate comprising a thermoplastic material substrate surface and a multi-region thermoplastic surfacing film layer positioned immediately adjacent the composite material substrate surface, with the multi-region thermoplastic surfacing film layer including a thermoplastic surfacing film layer first region, with the thermoplastic surfacing film layer first region positioned immediately adjacent the thermoplastic composite material substrate surface, with the thermoplastic surfacing film layer first region comprising a first visually-detectable color and a thermoplastic surfacing film layer first region thickness. The multi-region thermoplastic surfacing film layer further includes a thermoplastic surfacing film layer second region positioned immediately adjacent the thermoplastic surfacing film layer first region, with the thermoplastic surfacing film layer second region comprising a second visually-detectable color and further including a thermoplastic surfacing film layer second region average thickness. The thermoplastic surfacing film layer first region is co-extruded with the thermoplastic surfacing film layer second region to form the multi-region thermoplastic surfacing film, and wherein the first visually-detectable color is visually different from the second visually-detectable color, and wherein said thermoplastic surfacing film layer first region average thickness is greater than the thermoplastic surfacing film layer second region average thickness.

Another present aspect is direct to a method for treating a thermoplastic composite material surface, with the method including providing a thermoplastic composite substrate comprising a thermoplastic composite substrate surface, and applying a multi-region thermoplastic surfacing film layer to the thermoplastic composite substrate, with the multi-region thermoplastic surfacing film layer including a thermoplastic surfacing film layer first region positioned immediately adjacent the composite material substrate surface, said surfacing film layer first region comprising a first visually-detectable color and a surfacing film layer first region thickness, and a thermoplastic surfacing film layer second region positioned immediately adjacent the surfacing film layer first region, said thermoplastic surfacing film layer second region comprising a second visually-detectable color and a second surfacing film layer region thickness, said second visually-detectable color different from the first visually-detectable color. The method further includes removing a selected thickness from the multi-region thermoplastic surfacing film layer, with the selected thickness corresponding to the surfacing film layer second region thickness, and detecting a color change at an outer surface of the multi-region surfacing film layer to confirm removal of the selected thickness from the multi-layer surfacing film layer.

In another aspect, a method further includes visually-detecting the second-visually detectable color can be detected by the human eye.

In another aspect, a method further includes detecting the first visually-detectable color and the second-visually detectable color can with an optical sensor.

In a further aspect, the multi-region thermoplastic surfacing film layer comprises polyaryletherketone.

In another aspect, the multi-region thermoplastic surfacing film layer comprises at least one of polyetheretherketone and polyetherketoneketone.

In a further aspect, the multi-region thermoplastic surfacing film layer comprises a UV/visible light-resistant material.

In another aspect, the multi-region thermoplastic surfacing film layer has a resistivity ranging from about $1 \times 10e^5$ to about $1 \times 10e^{11}$ ohm-meter (ohm-m), and preferably from about $1 \times 10e^5$ to about $1 \times 10e^8$ ohm-m.

A further aspect is directed to a method for making a composite material laminate with the method including providing a thermoplastic composite substrate comprising a thermoplastic composite substrate surface, and applying a multi-region thermoplastic surfacing film layer to the thermoplastic composite substrate, with the multi-region thermoplastic surfacing film layer including a thermoplastic surfacing film layer first region positioned immediately adjacent the composite material substrate surface, said surfacing film layer first region comprising a first visually-detectable color and a surfacing film layer first region thickness, and a thermoplastic surfacing film layer second region positioned immediately adjacent the surfacing film layer first region, said thermoplastic surfacing film layer second region comprising a second visually-detectable color and a second surfacing film layer region thickness, said second visually-detectable color different from the first visually-detectable color. The method further includes removing a selected thickness from the multi-region thermoplastic surfacing film layer, with the selected thickness corresponding to the surfacing film layer second region thickness, and detecting a color change at an outer surface of the multi-region surfacing film layer to confirm removal of the selected thickness from the multi-layer surfacing film layer.

In another aspect, a method further comprises applying a thermoset composition layer to the surfacing film layer first region, with the thermoset composition comprising an epoxy-based composition.

In another aspect, a method further includes applying a top coat layer that can be a thermoset composition top coat to the thermoset composition layer that can be an epoxy-based composition is at least one of a primer and a top coat.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
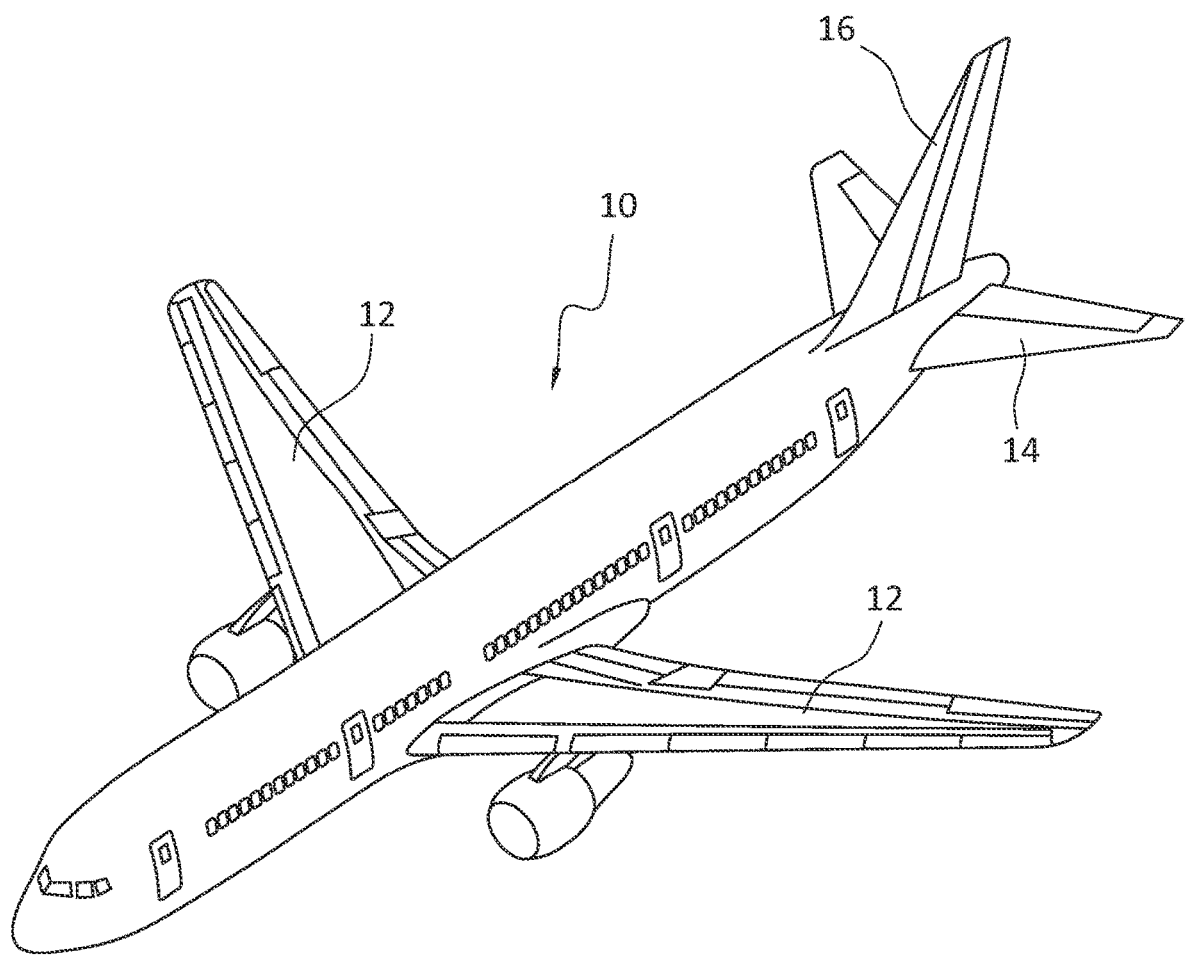
Figure 2:
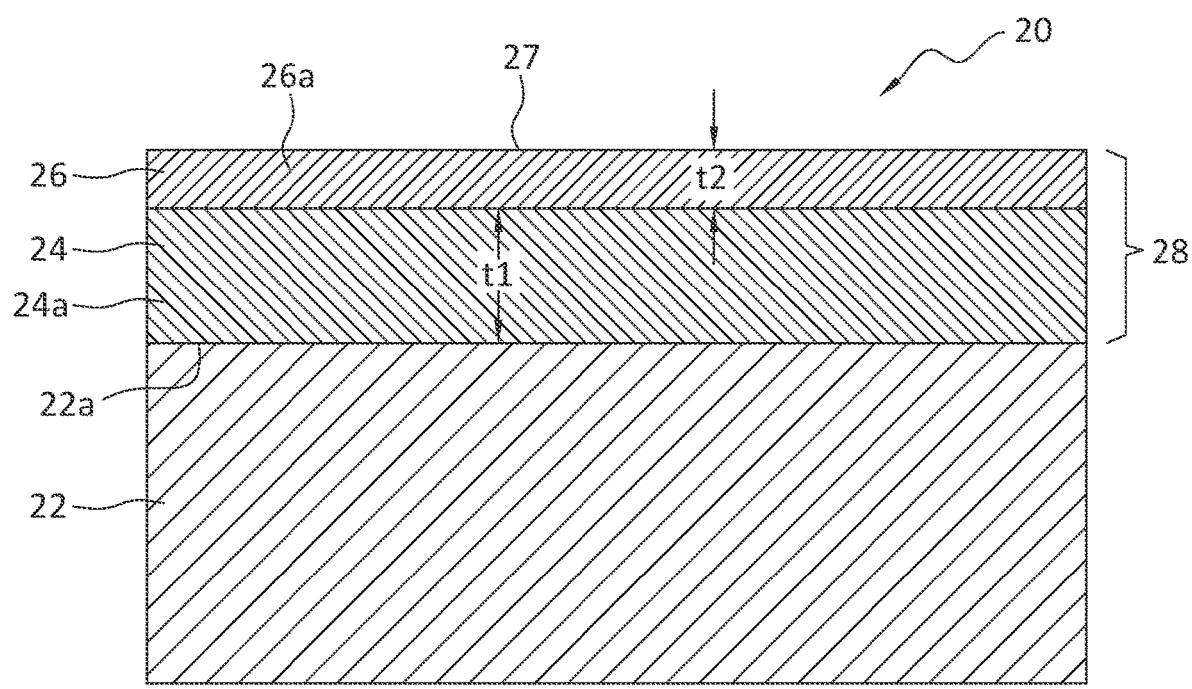
Figure 7:
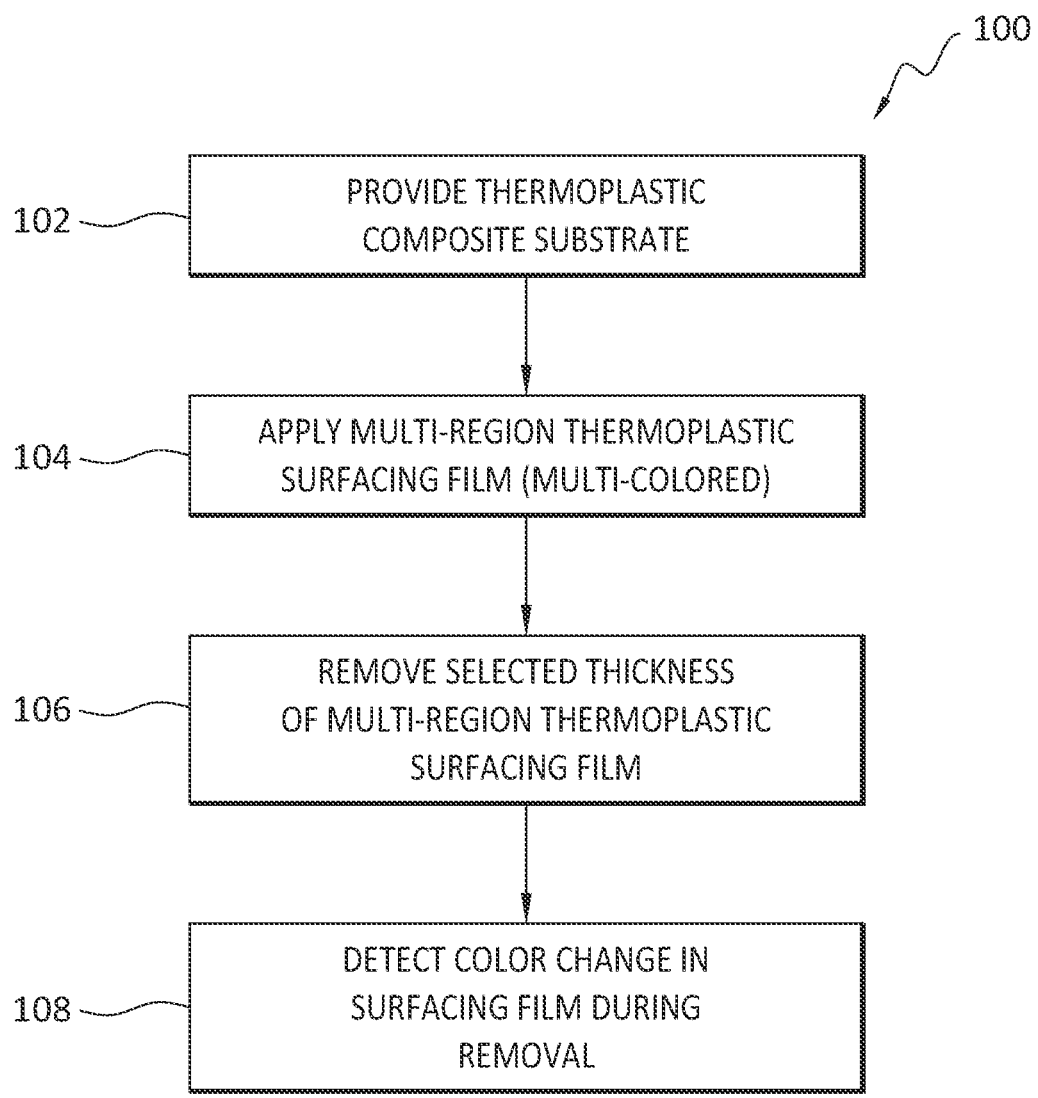
Figure 8:
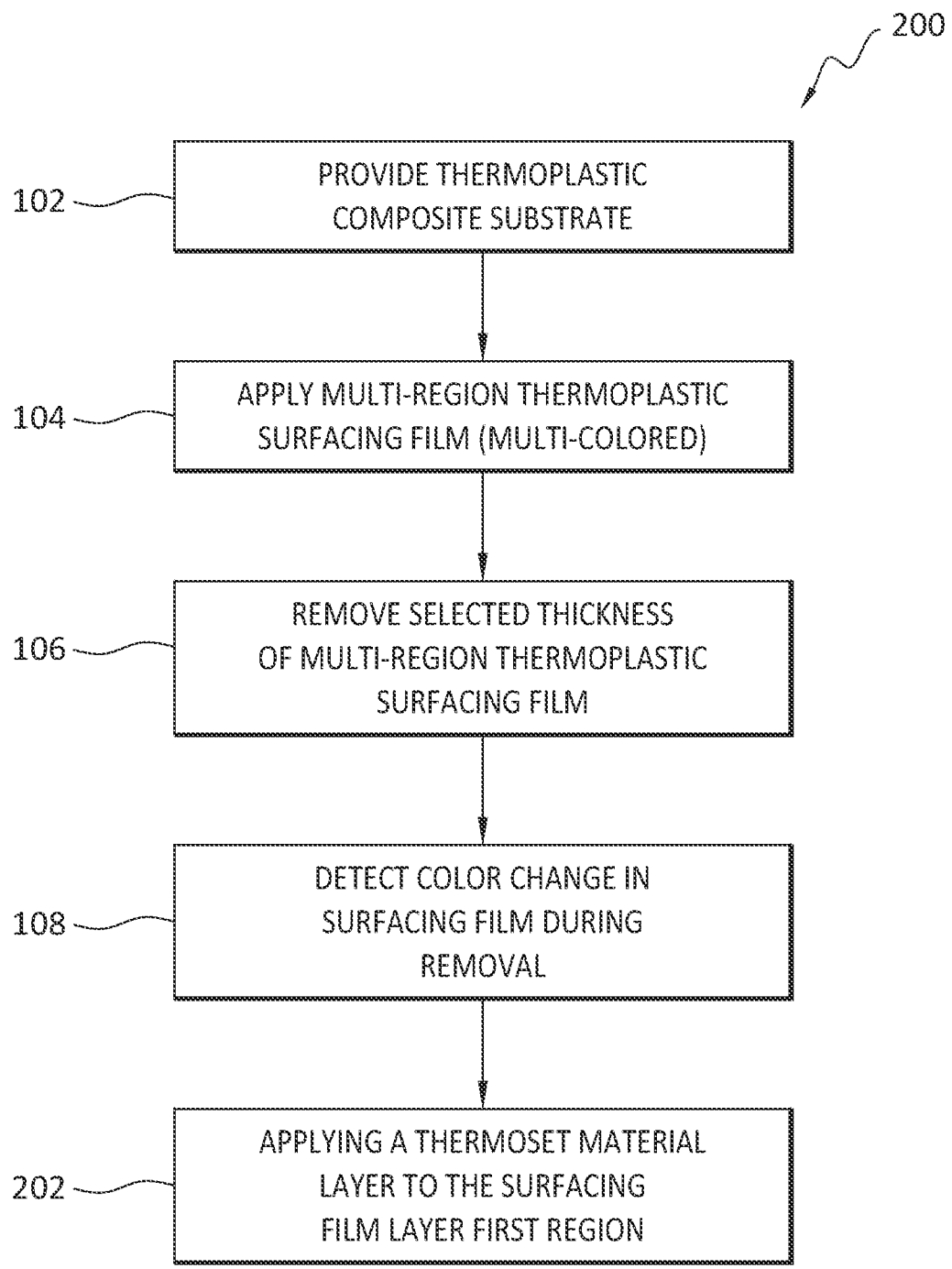

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an enlarged representative cross-sectional side view of a composite material stack, comprising an associated multi-region surfacing film layer according to present aspects;

FIG. 3 is an enlarged representative cross-sectional side view of a composite material stack, comprising an associated multi-region surfacing film layer according to present aspects;

FIG. 4 is an enlarged representative cross-sectional side view of a composite material stack, comprising an associated multi-region surfacing film layer according to present aspects;

FIG. 5 is an enlarged representative cross-sectional side view of a composite material stack, comprising an associated multi-region surfacing film layer with a first region of the multi-region surfacing film layer removed, according to present aspects;

FIG. 6 is an enlarged representative cross-sectional side view of a composite material stack, comprising an associated multi-region surfacing film layer with a first region of the multi-region surfacing film layer removed, according to present aspects;

FIG. 7 is a flowchart outlining a method, according to present aspects;

FIG. 8 is a flowchart outlining a method, according to present aspects; and

Figure 9:
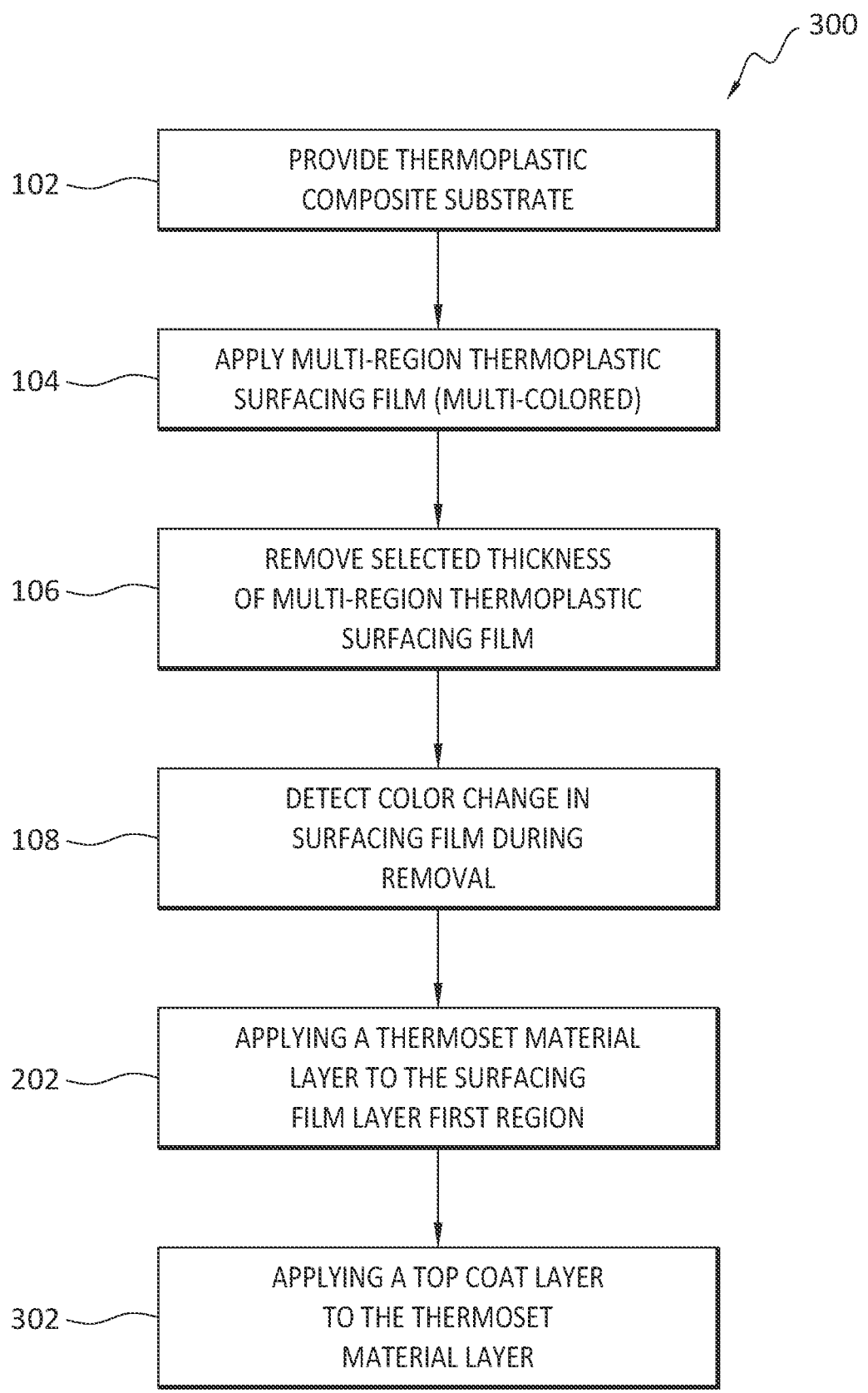

FIG. 9 is a flowchart outlining a method, according to present aspects.

DETAILED DESCRIPTION

While composite polymer materials afford various advantages in terms of strength-to-weight ratio, workability, durability, etc., the finishing of such composite materials layered within a composite material stack can present issues with respect to achieving selected overall characteristics of a composite material laminate comprising different material layers and differing material types. For example, while a composite material substrate may benefit from the characteristics afford by a thermoplastic polymer material substrate, a composite material surface may require characteristics better provided by, for example, a thermoset material.

Material layers that can be applied as, for example, coatings can be added to a composite material surface for the purpose of changing the surface characteristics of a composite material. For example, surfacing film layers, primers, or other coating layers can be added to a composite material surface to, for example, alter a composite material surface characteristic of a composite material stack (e.g., improving adhesion of subsequent coating layers to the "stack" such as, for example, paints, topcoats, etc.). Such a composite material may comprise a composite material surface that may already have one or more other coatings applied.

The layering of coating materials onto composite material surfaces is labor intensive, time-consuming and can add substantial weight to large objects and large structures that include such composite materials having multiple coating layers. When additional coating layers are added to a composite material that already comprises an applied surfacing film layer a composite material "stack" surface, the surfacing film layer itself can undergo treatment to ensure a selected adhesion of subsequent material layers (e.g., coating layers, primers, paint, etc.) to the surfacing film layer.

Treatment of a surfacing film layer also can be costly, time-consuming, labor-intensive, etc., and can involve, for example, sanding procedures and protocols that involve the know-how and experience of skilled artisans to ensure that a treated/sanded surfacing film layer surface will provide a selected degree of adhesion for additional material layers that are to be subsequently-applied to the treated/sanded surfacing film layer. In addition to providing a requisite finished surfacing film surface (e.g., a selected, increased surface area that will ensure a selected degree of adhesion for subsequently-applied material layers, etc.) extreme care must be exercised by skilled artisans to ensure that only a selected amount of surfacing film layer material is removed and/or that the entire surfacing film layer has not been completely removed from the composite material stack.

Present aspects are directed to improved composite material laminates and composite material processing and manufacture methods that comprise thermoplastic polymer substrate materials that are treated to increase compatibility with coating materials that can be thermoset materials that can include epoxy-based materials. The present composite material laminates comprise a surfacing film layer applied to a thermoplastic polymer composite material substrate, with the surfacing film layer treated to improve the adhesion and compatibility of subsequently applied thermoset material coating layers.

Further present aspects are directed to a composite material "stack", and to finished composite material laminate (and components, assemblies, structures comprising the composite material laminates) with a thermoplastic material film layer interposed between a thermoplastic composite substrate material and a thermoset coating composite material that can be, for example, an epoxy-based thermoset coating material.

Present aspects are directed to improving compatibility of thermoplastic composite substrate surfaces with applied selected thermoset coatings that can include, for example, an epoxy-based primer. Further present aspects are directed to improving the adhesion of a thermoset coating to a thermoplastic polymer substrate material surface by applying an interposed surfacing film layer (e.g., interposed between the thermoplastic substrate and the thermoset coating) in the form of a single layer of polymer film that is compatible with the thermoplastic chemistry of the thermoplastic substrate, and that further improves the adhesion of the thermoset coating to the thermoplastic polymer substrate.

The addition of a compatible surfacing film to the thermoplastic polymer material creates a favorable and improved thermoplastic polymer substrate surface to which a thermoset coating (e.g., primer, topcoat, etc.) can bond to a selected degree. According to present aspects, the surfacing film can be activated through physical increase in surface area via, for example, sanding, grit blasting, etc., that can decrease the thickness of the applied surfacing film layer.

According to present aspects, a surfacing film added to a thermoplastic polymer substrate can further significantly protect the thermoplastic polymer surface and significantly improve thermoplastic substrate finishing processes by providing a surfacing film layer that comprises wear-indication features at least for the purpose of facilitating the controlled removal from the surfacing film layer of a selected and desired amount of surfacing film material that will achieve a selected degree of surfacing film activation, and ensure that a selected amount of surfacing film layer material is not removed and remains in position against, for example, a thermoplastic polymer substrate material to which the surfacing film layer is attached/adhered/applied. That is, wear-indication features of the present surfacing film layer further significantly improves the surface activation and surface processing of the surfacing film, by guarding against the over-processing of the surfacing film layer that can result in the unwanted removal of portions of, or the accidental removal of the entirety of, the surfacing film layer during processing or reworking of a composite material laminate stack.

During the fabrication of composite material parts that can include for example, an epoxy resin-based composite material, a carbon fiber reinforced polymer material, etc., composite material surfaces can begin to degrade at the composite material surface due to exposure to ambient ultraviolet/visible light (UV/visible light) radiation. To avoid a change in surface characteristic of a composite material that can be caused, at least in part, by composite material exposure to UV/visible light radiation, composite material surfaces are often protected with polymeric coverings or coated with at least one protective layer such as, for example, a spray applied surfacer, a primer layer, etc., with the protective layer containing, for example, a UV "blocking" agent.

Applying UV mitigation, or "blocking" agents in layers to composite surfaces often adds manufacturing complexity in the form of, at least, increasing manufacturing time, increasing rework time, increasing overall production cost, etc., as such applied UV blocking material coverings typically are removed from the composite material or reactivated chemically or mechanically before additional composite material assembly processing is conducted. In addition primer and surfacing film layers are often treated to accommodate a subsequent paint layer or topcoat. This treatment of individual subsequent layers added to a composite material system (that can be layers arranged into a "stack" on the composite material substrate) again leads to increased manufacturing time, increased rework time, increased overall production cost, etc.

Composite materials are typically post-processed or "reworked", for example, to re-paint and/or resurface composite materials. For example, primers and paint coatings that include a UV mitigation, or a UV "blocking" agent can be applied to a composite material surface for the purpose of protecting a composite material surface from degradation and/or discoloration that can be caused, for example, by exposing the composite material to ultraviolet/visible light (UV/visible light) radiation during the use of the composite material as a construction material in the manufacture of, for example, a larger structure.

In addition, UV/visible light damage from UV/visible light wavelengths impacting coating layers used to coat composite materials and/or impacting underlying composite materials during aircraft manufacture and aircraft use can cause a composite material to require material rework. Exposure to UV/visible light radiation can alter a substrate material characteristic, over time. For example, UV/visible light radiation can render a coating layer or composite material substrate and/or substrate surface vulnerable to processing damage, such as, for example, when a layer of composite material is exposed to, for example, a mechanical paint removal technique. Material layer selection for large structures to guard against environmental damage, including UV/visible light damage, can result in a required application of a series of coating layers, with each such coating layer application resulting in a significant amount of time, expense, and resulting added weight to large structures including, for example, aircraft (where weight considerations can further impact fuel usage, cargo and passenger capacity, aircraft range, etc.).

Present aspects are directed to a multi-region polymer surfacing film layer configured to improve adhesion between a thermoplastic composite substrate surface and a thermoset coating layer, with the multi-region polymer surfacing film layer comprising first and second regions having visually-detectable differing colors and further comprising a UV/visible light-resistant agent. The incorporation of a UV/visible light-resistant agent into the presently disclosed multi-region polymer surfacing film layer obviates the need to provide a separate UV/visible light-resistant layer into a composite material stack, and can significantly reduce overall weight of: 1) the composite material structure; 2) assemblies comprising the composite material structure; and 3) large objects comprising the assemblies comprising the composite material structure.

In addition to the weight reduction, obviating the need to include separate UV/visible light-resistant layers into a composite material stack (e.g., for the protection of composite materials from UV/visible light damage, and in the preparation of a composite material system used in structural assemblies for larger components, including internal and exterior surfaces of vehicles, including, for example, aircraft) can significantly reduce manufacturing man hours, eliminate coating process steps, reduce manufacturing cycle-time, reduce rework time, and reduce overall manufacturing and/or rework cost.

As stated herein, the presently disclosed UV/visible light-resistant capabilities incorporated into the multi-region thermoplastic surfacing film layer further streamlines processing steps that would otherwise be required if the entirety of a surfacing film layer were removed from a composite material substrate surface during, for example, reworking; and potentially exposing the substrate surface to UV/visible light damage. According to present aspects, since the surfacing film layer will be visually detectable, as composite material coatings are removed during, for example, rework, at least a selected portion of the surfacing film layer can remain in place protecting the outer surface of the composite material substrate.

According to present aspects, a significant number of procedural steps that are otherwise, and have previously been, required during re-painting or reworking a composite material substrate are obviated; resulting in a substantial reduction in resources including, for example, material cost for replacing UV/visible light-damaged layers, manpower hours previously required for individual layer application treatment (e.g., individual layer pre-treatment surfacing steps, layer application steps, layer post-treatment surfacing steps, including chemical application, physical surfacing treatments such as, including sanding, etc., inspection of deposited layers, etc.).

In one example, the UV/visible light-resistant agents can include, for example titanium dioxide, carbon black pigment, etc., with the multi-region polymer surfacing film layer able comprising a UV/visible light transmittance value, for example, ranging from about 0% to about 20% UV/visible light transmittance for UV/visible light wavelengths ranging from about 200 nm to about 800 nm.

According to further present aspects, the average thickness of additional coating layers in a thermoplastic composite material stack (e.g., primer layers, adhesive layers, etc.) can be greatly reduced as compared to the number of layers and the thickness of such layers previously required for known composite material assemblies. More specifically, incorporating UV/visible light-resistant agents into the present thermoplastic surfacing film layer to form the present UV/visible light-resistant surfacing film layer, can significantly reduce thicknesses of composite material stack layers previously required to achieve a degree of UV protection. That is, incorporating UV/visible light-resistant agents into the thermoplastic surfacing film layer of the present composite material stacks and composite material assembly, can reduce previously required thicknesses of subsequent coating layers previously required, can reduce the number of subsequent coating layers previously required, and/or previously required subsequent coating layers can be eliminated. Such reduction in number of subsequent coatings, subsequent coating layer thickness, and/or the elimination of coatings such as, for example, primers can result in a significant weight reduction (e.g., hundreds of pounds, or more), cost reduction, processing time reduction, rework time reduction, man/hour labor reduction, and reduction of required material, due to the scale of a large structure having large structure assemblies including, for example, aircraft.

Further, some coatings (e.g., paints and primers, etc.) and sealants are often electrically insulative and can result in an impediment to the dissipation of static and other electrical charges. However, certain structures require the need to dissipate electrical charges that build up on a structure's interior and/or exterior surfaces, including static electrical charges, and charges resulting from, for example lightning strikes, etc. The need for electrical charge dissipation is increasingly important in the aircraft industry, as aircraft manufacture continues to incorporate non-metallic materials. Further, in certain aircraft assemblies, non-metallic materials, such as composites, plastics, etc., that do not dissipate electrical charges predictably across their surfaces may be joined with, or otherwise contact, assemblies and sub-assemblies that comprise metallic materials that do conduct electrical charges. That is, components, assemblies and sub-assemblies that include both composite and metallic materials may be used in the manufacture of, or otherwise incorporated into, larger structures (e.g., aircraft).

Such structures may encounter electromagnetic effects (EMEs) including, for example, and without limitation, lightning strikes. When a structure encounters an EME, the charge delivered to the structure travels throughout any conductive path, and can cause damage to exposed dielectric materials including, for example, composite materials. If the path of charges resulting from an EME encounters varying materials having varying conductivities, damage at or near the material interface can occur. Such interfaces include, without limitation, fasteners/substrate interfaces; and can further include joint interfaces where, for example, seals occur.

According to further aspects, the multi-region thermoplastic surfacing film layer can incorporate conductive material to ameliorate EMEs. The incorporation of conductive material(s) into the surfacing film layer can further obviate the need for other conductive coating layers applied to the stack that may have been previously required in composite material "stack". In one example, the present multi-region thermoplastic surfacing film layer can have a resistivity ranging from about $1 \times 10e^5$ to about $1 \times 10e^{11}$ ohm-meter (ohm-m). In another example, the present multi-region thermoplastic surfacing film layer can have a resistivity ranging from about $1 \times 10e^5$ to about $1 \times 10e^8$ ohm-m.

FIG. 1 is an illustration of a vehicle in the form of an aircraft, according to present aspects. As shown in FIG. 1, aircraft 10 includes wing assemblies 12, horizontal stabilizer assemblies 14, and vertical stabilizer assembly 16 with the presently disclosed composite materials configured to form and otherwise be configured to various aircraft assemblies including those shown in FIG. 1.

As explained herein, the thermoplastic composite material substrate, also referred to equivalently herein as the "base layer", the "underlayer", the "substrate", or the "composite material substrate layer" can be an extruded thermoplastic composite material. In addition, the multi-region thermoplastic surfacing film can also be applied to the thermoplastic substrate as a co-extruded multi-region layer. Still further, the extruded thermoplastic polymer substrate can be co-extruded with the extruded multi-region surfacing film co-extruded into position and along with the thermoplastic polymer substrate material, for example, in a single step.

FIG. 2 is an enlarged cross-sectional representative side view of a present thermoplastic composite material stack 20, with the thermoplastic composite material stack 20 comprising a thermoplastic composite material substrate 22 comprising thermoplastic composite material substrate surface 22a, with a multi-region thermoplastic surfacing film layer 28 disposed onto the thermoplastic composite material substrate surface 22a of the thermoplastic composite substrate 22. The multi-region thermoplastic surfacing film layer 28 comprises a multi-region thermoplastic surfacing film layer surface 27 The multi-region thermoplastic surfacing film 28 is made from a thermoplastic material that is compatible with the thermoplastic composite substrate 22 and that is further compatible with subsequent coatings that can be, for example, thermoset coating materials that can be epoxy-based thermoset coating materials, such as epoxy-based primers that can be included in a final composite material stack.

According to present aspects, the multi-region thermoplastic surfacing film 28 of the type shown in FIG. 2 can be a single layer film that comprises two distinct and visually detectable "regions" within the single layer film that can be, for example, a single layer of co-extruded thermoplastic material having the two distinct "regions", while still considered to be a single layer film of a single thermoplastic material type, with the only difference between the two regions being, for example, a color difference that is visually detectable. In one example, the multi-region thermoplastic surfacing film layer 28 comprises a multi-region surfacing film layer first region 24 (comprising a multi-region surfacing film layer first region average thickness "t1") that is positioned adjacent the thermoplastic composite substrate 22, with the multi-region thermoplastic surfacing film second region 26 shown in FIG. 2 positioned adjacent to the multi-region thermoplastic surfacing film first region 24, with the multi-region surfacing film layer second region 26 comprising multi-region surfacing film layer second region average thickness "t2".

As stated herein, the multi-region thermoplastic surfacing film first region 24 and second region 26 together comprise the multi-region thermoplastic surfacing film 28. The variance in "cross-hatching" between the first region 24 and second region 26 of the multi-region thermoplastic surfacing film layer 22 (that can be a single film) is provided to indicate that the only difference between the first and second region 24, 26 of the surfacing film 22 is the visually-detectable appearance of each of the first and second regions 24, 26, respectively. According to present aspects, the first region 24 has a visually-detectable first color 24a and the second region has a visually-detectable second color 26a that is visually distinct from the visually-detectable first color, with visually-detectable first and second colors 24a, 26a being visually different colors (e.g., capable of being differentiated by a visual inspection, etc., such as, for example "red" and "green" in appearance).

The multi-region thermoplastic surfacing film layer is formulated to be compatible with (and increase the compatibility with one another of) both the underlying thermoplastic composite substrate material and an overlying coating layer (e.g., applied to and over the surfacing film layer). The coating layer can be thermoset coating material layers (e.g., primers) that can be an epoxy-based thermoset coating material layer.

According to present aspects, the thermoplastic composite substrate comprises a thermoplastic polymer that, in one example, includes a polyaryletherketone polymer. The thermoplastic composite substrate can be formed of a plurality of plies of laminate that can include a polymer from the family of polyaryletherketone (PAEK) polymers. In one example, at least two plies of the laminate include polyether ketone ketone (PEEK).

According to present aspects, it may be desired for the thermoplastic composite substrate to support thermoset material coatings where compatibility between the thermoplastic and thermoset materials are problematic. According to present aspects, the multi-region thermoplastic surfacing film is formulated to improve such compatibility between thermoplastic and thermoset materials and is interposed therebetween in a composite material stack.

The multi-region thermoplastic surfacing film layer, according to present aspects, can include a thermoplastic polymer and a polyaryletherketone polymer, for example, in an admixture. In one example, the thermoplastic composite substrate can be manufactured by combining and blending the thermoplastic polymer and the polyaryletherketone polymer in an extruder and extruding the resulting composition as a film. The thermoplastic polymer in the surfacing film can be selected based upon material properties such as threshold adhesive properties that align with a subsequent mating thermoset coating applied to the surfacing film, as well as miscibility properties with the underlying thermoplastic composite substrate that is configured to receive the thermoplastic surfacing film. Through the addition of the surfacing film onto the thermoplastic composite substrate, compatibility of the thermoset coating with the thermoplastic composite substrate is significantly enhanced.

The multi-region thermoplastic surfacing film layer of the present aspects comprises thermoplastic polymers that are miscible with polyether ketone polymers. In one example, the thermoplastic polymer includes polyetherimide. The thermoplastic polymer can be amorphous and is compatible with aerospace grade paints and coatings, and is stable at processing temperatures of at least about 350° C.

In one example, the polyaryletherketone polymer is a semi-crystalline material belonging to the family of polyaryletherketone (PAEK) polymers. In present examples, the polyaryletherketone can include polyether ether ketone, can include polyether ketone ketone, and can include a blend of polyether ether ketone and polyether ketone ketone.

The thermoplastic surfacing film layer comprises a melting temperature based upon the ratio of thermoplastic polymer to the polyaryletherketone polymer and the respective melting temperatures of each of the thermoplastic polymer to the polyaryletherketone. In one example, the melting temperature of the polyaryletherketone polymer ranges from about 275° C. to about 350° C. In another example, the melting temperature of the polyaryletherketone is at least about 350° C.

The thermoplastic surfacing film layer comprises a thermoplastic composition that can include a ratio of thermoplastic polymer-to-polyaryletherketone ranging from between about 1:20 to about 1:1. In another example, thermoplastic composition includes a ratio of thermoplastic polymer-to-polyaryletherketone ranging from between about 10:90 to about 50:50. In another example, thermoplastic composition includes a ratio of thermoplastic polymer-to-polyaryletherketone ranging from between about 20:80 to about 50:50.

The thermoplastic composition of the thermoplastic surfacing film layer, according to present aspects, includes a degree of crystallinity to be defined as semi-crystalline. In one example, the degree of crystallinity ranges from about 1 percent to about 30 percent. In another example, the degree of crystallinity ranges from about 2 percent to about 15 percent. In another example, the degree of crystallinity ranges from about 3 percent to about 10 percent.

FIGS. 3, 4, 5, and 6 are enlarged drawings of representative cross-sectional side views of composite material "stacks" according to present aspects, and composite material stacks comprising multi-region thermoplastic surfacing film layer according to present aspects. As shown in FIG. 3, thermoplastic composite material stack 20 comprises a thermoplastic composite material substrate 22 with a multi-region thermoplastic surfacing film layer 28 disposed on a surface of the thermoplastic composite substrate 22. The multi-region thermoplastic surfacing film 28 is made from a thermoplastic material that is compatible with the thermoplastic composite substrate 22 and that is further compatible with subsequent coatings that can be, for example, thermoset coating materials that can be epoxy-based thermoset coating materials, such as epoxy-based primers that can be included in a final composite material stack. In one example, as shown in FIG. 3, the multi-region thermoplastic surfacing film layer 28 comprises a multi-region surfacing film layer first region 24 and having visually-detectable first region color 24a positioned adjacent the thermoplastic composite substrate 22, with the multi-region thermoplastic surfacing film second region 26 having visually-detectable second region color 26a positioned adjacent to the multi-region thermoplastic surfacing film first region 24.

FIGS. 4, 5, 6 show stages in a progression for coating a thermoplastic composite substrate 22 with a multi-region thermoplastic surfacing film layer 28 applied to the thermoplastic composite material to form composite material stack 20, with the thermoplastic surfacing film layer 28 treated to remove a region from the thermoplastic surfacing film layer 28, and increasing the compatibility of thermoset coating layers 30, 40 that are then added to form composite material stacks 20a, 20b.

As shown in FIG. 4, according to present aspects, the thermoplastic composite material stack 20 shown in FIG. 3 is prepared for processing to remove a portion of the multi-region thermoplastic surfacing film layer 28 that is equivalent to the multi-region thermoplastic surfacing film second region 26 having visually-detectable second color 26a positioned adjacent to the multi-region thermoplastic surfacing film first region 24 (having visually detectable first region color 24a that is visually-detectable as a color that is a different color as compared to second color 26a). A non-exhaustive list of material removal processes can include, for example, sanding, grit-blasting, laser ablation, etc.

The removal of the multi-region thermoplastic surfacing film second region 26 is visually-detectable by an operator and can otherwise be determined as the color 26a of the multi-region thermoplastic surfacing film second region 26 will no longer appear. Instead, a contrasting color change will occur during material removal as the second region 26 is no longer present as evidenced by the first region color 24a of the multi-region thermoplastic surfacing film first region 24 (at multi-region thermoplastic surfacing film first region surface 25) is now visually-detectable, alerting an operator that the totality of the multi-region thermoplastic surfacing film second region 26 (having the second region color 26a) has been removed, enough of the surfacing film layer film 28 has been removed, and the material removal processing operation can cease.

After removal of the multi-region thermoplastic surfacing film layer second region 26, a thermoset primer coating 30, that can be an epoxy-based thermoset primer coating layer is shown in FIG. 5 as applied to the multi-region surfacing layer first region 24 to form a new primed thermoplastic composite "stack" 20a that now comprises primer coating layer 30 having a primer coating layer surface 30a.

FIG. 6 shows the thermoplastic composite material stack 20a of FIG. 5 now comprising a top coat layer 32 applied to the primer coating layer 30 having a primer coating layer surface 30a. In one example, the top coat can be, for example, a urethane coating to form composite material "stack" 20b.

The material deposition method selected to apply the thermoplastic surfacing film layer to the thermoplastic composite substrate can include a suitable a co-extrusion or co-consolidation method occurring substantially coincident with and/or immediately following construction of the thermoplastic composite substrate such that the substrate and surfacing material layer film cools coincidently. In another example, the surfacing layer film is deposited separately and then applied to the substrate, with further heating of the thermoplastic materials achieving a desired miscibility mat the surface of the thermoplastic composite substrate. Regardless of the co-consolidation method selected (with the method having selected temperature and time protocols, for example), according to present aspects, the thermoplastic surfacing film is con-consolidated with the thermoplastic composite substrate to preserve two distinct regions within the multi-region thermoplastic surfacing film. The first and second regions within the multi-region film differ from one another only with respect to the varying color, both of which are visually-detectable when the first and second regions are exposed at the outer surface of stack" 20.

The varying colors of the first and second regions of the multi-region thermoplastic surfacing film layer can be created by including dyes, pigments, and other coloring agents that will remain stable at heating and cooling temperature cycles conducted during the formation and processing (e.g., a thermoplastic co-extruding and/or thermoplastic co-consolidation process) of the surfacing film and during the application (e.g., the co-extruding and/or co-consolidation) of the surfacing film at the surface of the thermoplastic composite substrate. Preferred coloring agents can comprise, without limitation, titanium dioxide, carbon black pigment, etc. The coloring agents are understood to leave the physical and chemical characteristics of the surfacing film unchanged. In such examples, contemplated coloring agents to be incorporated into the multi-region thermoplastic surfacing film layer can be considered to be chemically "inert".

FIG. 7 is a flowchart outlining a method 100 according to present aspects, with method 100 including providing 102 a thermoplastic composite substrate comprising a thermoplastic composite substrate surface, and applying 104, via, for example, co-extrusion and/or co-consolidation process a multi-region thermoplastic surfacing film layer to the thermoplastic composite substrate, with the multi-region thermoplastic surfacing film layer including a thermoplastic surfacing film layer first region positioned immediately adjacent the composite material substrate surface, said surfacing film layer first region comprising a first visually-detectable color and a surfacing film layer first region thickness, and a thermoplastic surfacing film layer second region positioned immediately adjacent the surfacing film layer first region, said thermoplastic surfacing film layer second region comprising a second visually-detectable color and a second surfacing film layer region thickness, said second visually-detectable color different from the first visually-detectable color. The method further includes removing 106 a selected thickness from the multi-region thermoplastic surfacing film layer, with the selected thickness removed corresponding to the surfacing film layer second region thickness, and visually detecting 108 a color change at an outer surface of the multi-region surfacing film layer to confirm removal of the selected thickness from the multi-layer surfacing film layer.

FIG. 8 is a flowchart outlining a method 200 according to present aspects, with method 100 including providing 102 a thermoplastic composite substrate comprising a thermoplastic composite substrate surface, and applying 104, via, for example, co-extrusion and/or co-consolidation process a multi-region thermoplastic surfacing film layer to the thermoplastic composite substrate, with the multi-region thermoplastic surfacing film layer including a thermoplastic surfacing film layer first region positioned immediately adjacent the composite material substrate surface, said surfacing film layer first region comprising a first visually-detectable color and a surfacing film layer first region thickness, and a thermoplastic surfacing film layer second region positioned immediately adjacent the surfacing film layer first region, said thermoplastic surfacing film layer second region comprising a second visually-detectable color and a second surfacing film layer region thickness, said second visually-detectable color different from the first visually-detectable color. The method further includes removing 106 a selected thickness from the multi-region thermoplastic surfacing film layer, with the selected thickness removed corresponding to the surfacing film layer second region thickness, and visually detecting 108 a color change at an outer surface of the multi-region surfacing film layer to confirm removal of the selected thickness from the multi-layer surfacing film layer. Method 200 further includes applying 202 a thermoset composition layer to the surfacing film layer first region, with the thermoset composition comprising an epoxy-based composition that can be a primer.

FIG. 9 is a flowchart outlining a method 300 according to present aspects, with method 100 including providing 102 a thermoplastic composite substrate comprising a thermoplastic composite substrate surface, and applying 104, via, for example, co-extrusion and/or co-consolidation process a multi-region thermoplastic surfacing film layer to the thermoplastic composite substrate, with the multi-region thermoplastic surfacing film layer including a thermoplastic surfacing film layer first region positioned immediately adjacent the composite material substrate surface, said surfacing film layer first region comprising a first visually-detectable color and a surfacing film layer first region thickness, and a thermoplastic surfacing film layer second region positioned immediately adjacent the surfacing film layer first region, said thermoplastic surfacing film layer second region comprising a second visually-detectable color and a second surfacing film layer region thickness, said second visually-detectable color different from the first visually-detectable color. The method further includes removing 106 a selected thickness from the multi-region thermoplastic surfacing film layer, with the selected thickness removed corresponding to the surfacing film layer second region thickness, and visually detecting 108 a color change at an outer surface of the multi-region surfacing film layer to confirm removal of the selected thickness from the multi-layer surfacing film layer. Method 300 further includes applying 202 a thermoset composition layer to the surfacing film layer first region, with the thermoset composition comprising an epoxy-based composition, and applying 302 a top coat layer that can include a thermoset material to the thermoset composition layer that can be an epoxy-based composition that can be a primer.

Methods 100, 200, 300, as shown in FIGS. 7, 8, 9, respectively, are understood to incorporate the thermoplastic composite substrate as modified by the multi-region thermoplastic surfacing film layer shown in any of FIGS. 1, 2, 3, 4, 5, and 6.

The visually-detectable color change of the surfacing film made to occur during material removal of a thickness of the surfacing film can be visually-detectable to the human eye, such that a human operator will visually detect and otherwise visually perceive the changing color as evidence that the second region of the multi-region surfacing film has been removed, and material removal can cease. In another example, if the material removal of a portion of the multi-region thermoplastic surfacing film layer is an automated process, present aspect contemplate incorporating a detector in the form of, for example, an optical sensor that can "read", "sense", "detect", etc., a color change occurring during material removal. Such automated visual detectors can incorporate a laser or other device to sense or otherwise detect the changing color at the point of material removal of a portion of the multi-region thermoplastic surfacing film layer. Such automated and, for example, programmable material removal processes can comprise the necessary hardware, software, one or more controllers, with the color detector in communication with such components, and with the color detector configured to generate a signal to a controller when a color change is detected and otherwise recognized by the detector.

Present aspects are further directed to components comprising the thermoplastic composite structure shown in the present FIGS., assemblies comprising the structures and components, and large structures comprising the assemblies including for example, vehicles that can include aircraft, with aircraft assemblies including, for example, aircraft wing assemblies, horizontal stabilizer assemblies, vertical stabilizer assemblies, fuselages, fuel tanks within wing assemblies, nacelles, and other aircraft structures and structural components comprising a composite material.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A multi-region thermoplastic surfacing film layer for a thermoplastic composite substrate, the multi-region thermoplastic surfacing film layer comprising:
   a thermoplastic surfacing film layer first region, said thermoplastic surfacing film layer first region comprising a first visually-detectable color and further comprising a thermoplastic surfacing film layer first region average thickness;
   a thermoplastic surfacing film layer second region positioned immediately adjacent the thermoplastic surfacing film layer first region, said thermoplastic surfacing film layer second region comprising a second visually-detectable color and further comprising a thermoplastic surfacing film layer second region average thickness;
   wherein said thermoplastic surfacing film layer first region is co-extruded with the thermoplastic surfacing film layer second region to form the multi-region thermoplastic surfacing film;
   wherein the first visually-detectable color is visually different from the second visually-detectable color; and
   wherein the thermoplastic surfacing film layer first region average thickness compared to the thermoplastic surfacing film layer second region average thickness establishes a ratio ranging from about 3:1 to about 10:1.

2. The multi-region thermoplastic surfacing film layer of claim 1, wherein, said thermoplastic surfacing film layer first region average thickness is greater than the thermoplastic surfacing film layer second region average thickness.

3. The multi-region thermoplastic surfacing film layer of claim 1, wherein the thermoplastic surfacing film layer first region average thickness comprises a first substantially equivalent average thickness across the thermoplastic surfacing film layer first region, said first substantially equivalent average thickness ranging from about 0.75 mils to about 10 mils.

4. The multi-region thermoplastic surfacing film layer of claim 1, wherein the thermoplastic surfacing film layer second region average thickness comprises a second substantially equivalent average thickness across the thermoplastic surfacing film layer second region, said second substantially equivalent average thickness ranging from about 0.25 mils to about 5 mils.

5. The multi-region thermoplastic surfacing film layer of claim 1, wherein a difference between the first visually-detectable color and the second visually-detectable color is detectable by a human eye.

6. The multi-region thermoplastic surfacing film layer of claim 1, wherein the first visually-detectable color and the second visually-detectable color are detectable by an optical sensor.

7. A thermoplastic composite structure comprising:
a thermoplastic composite material substrate comprising a thermoplastic composite material substrate surface;
a multi-region thermoplastic surfacing film layer positioned immediately adjacent the thermoplastic composite material substrate surface, said multi-region thermoplastic surfacing film layer comprising:
a thermoplastic surfacing film layer first region, said thermoplastic surfacing film layer first region positioned immediately adjacent the thermoplastic composite material substrate surface, said thermoplastic surfacing film layer first region comprising a first visually-detectable color and a thermoplastic surfacing film layer first region average thickness;
a thermoplastic surfacing film layer second region positioned immediately adjacent the thermoplastic surfacing film layer first region, said thermoplastic surfacing film layer second region comprising a second visually-detectable color and a thermoplastic surfacing film layer second region average thickness;
wherein said thermoplastic surfacing film layer first region is co-extruded with the thermoplastic surfacing film layer second region to form the multi-region thermoplastic surfacing film layer;
wherein the first visually-detectable color is visually distinct from the second visually-detectable color; and
wherein the thermoplastic surfacing film layer first region average thickness compared to the thermoplastic surfacing film layer second region average thickness establishes a ratio ranging from about 3:1 to about 10:1.

8. The thermoplastic composite structure of claim 7, wherein said thermoplastic surfacing film layer first region thickness is greater than the thermoplastic surfacing film layer second region thickness.

9. The thermoplastic composite structure of claim 7, wherein the multi-region thermoplastic surfacing film layer comprises a thickness ranging from about 1 mil to about 15 mils, with the thermoplastic surfacing film layer first region thickness ranging from about 0.75 mil to about 10 mils.

10. The thermoplastic composite structure of claim 7, wherein the multi-region thermoplastic surfacing film layer comprises a thickness ranging from about 1 mil to about 15 mils, with the thermoplastic surfacing film layer second region thickness ranges from about 0.25 mil to about 5 mils.

11. The thermoplastic composite structure of claim 7, wherein the first visually-detectable color and the second-visually detectable color is detectable by a human eye.

12. The thermoplastic composite structure of claim 7, wherein the first visually-detectable color and the second-visually detectable color are detectable by an optical sensor.

13. The multi-region thermoplastic surfacing film layer of claim 1, wherein the multi-region thermoplastic surfacing film layer further comprises a UV/visible light-resistant material.

14. An object comprising the thermoplastic composite structure of claim 7.

15. A vehicle comprising the thermoplastic composite structure of claim 7.

16. The vehicle of claim 15, wherein the vehicle is selected from the group consisting of: a crewed aircraft, an uncrewed aircraft, a crewed spacecraft, an uncrewed spacecraft, a crewed rotorcraft, an uncrewed rotorcraft, a crewed terrestrial vehicle, an uncrewed terrestrial vehicle, a crewed surface water borne vehicle, an uncrewed surface water borne vehicle, a crewed sub-surface waterborne vehicle, an uncrewed sub-surface waterborne vehicle, and combinations thereof.

17. A method for treating a thermoplastic composite material surface comprising:
providing a thermoplastic composite substrate comprising a thermoplastic composite substrate surface;
applying a multi-region thermoplastic surfacing film layer to the thermoplastic composite substrate surface, said multi-region thermoplastic surfacing film layer comprising:
a thermoplastic surfacing film layer first region positioned immediately adjacent the composite material substrate surface, said surfacing film layer first region comprising a first visually-detectable color and a surfacing film layer first region average thickness;
a thermoplastic surfacing film layer second region positioned immediately adjacent the surfacing film layer first region, said thermoplastic surfacing film layer second region comprising a second visually-detectable color and a second surfacing film layer region average thickness, said second visually-detectable color visually distinct from the first visually-detectable color;
removing a selected thickness from the multi-region thermoplastic surfacing film layer, said selected thickness corresponding to the thermoplastic surfacing film layer second region average thickness;
detecting a color change at an outer surface of the multi-region surfacing film layer to confirm removal of the selected thickness from the multi-layer surfacing film layer; and
wherein the thermoplastic surfacing film layer first region average thickness compared to the thermoplastic surfacing film layer second region average thickness establishes a ratio ranging from about 3:1 to about 10:1.

18. The method of claim 17, further comprising visually detecting the second-visually detectable color.

19. The method of claim 17, wherein the multi-region thermoplastic surfacing film layer comprises polyaryletherketone.

20. The method of claim 17, wherein the multi-region thermoplastic surfacing film layer comprises at least one of polyetheretherketone and polyetherketoneketone.

21. The method of claim 17, wherein the multi-region thermoplastic surfacing film layer comprises a UV/visible light-resistant material.

22. The method of claim 18, wherein at least the second visually-detectable color is visually detectable by a human eye.

23. The method of claim 18, wherein at least the second visually-detectable color is visually detectable by an optical sensor.

24. The thermoplastic composite structure of claim 7, wherein the thermoplastic surfacing film layer first region average thickness compared to the thermoplastic surfacing film layer second region average thickness establishes a ratio of about 4:1.

25. The thermoplastic composite structure of claim 7, wherein the multi-region thermoplastic surfacing film comprises polyaryletherketone.

26. The thermoplastic composite structure of claim 7, wherein the multi-region thermoplastic surfacing film comprises at least one of polyetheretherketone and polyetherketoneketone.

27. The thermoplastic composite structure of claim 7, further comprising a UV/visible light-resistant material.

28. The thermoplastic composite structure of claim 7, wherein the multi-region thermoplastic surfacing film layer has a resistivity ranging from about $1 \times 10e^5$ to about $1 \times 10e^{11}$ ohm-meter (ohm-m), and from about $1 \times 10e^5$ to about $1 \times 10e^8$ ohm-m.

* * * * *